May 11, 1965  E. GIRARDELLO  3,182,749
LADDER PLATFORMS
Filed Feb. 18, 1963
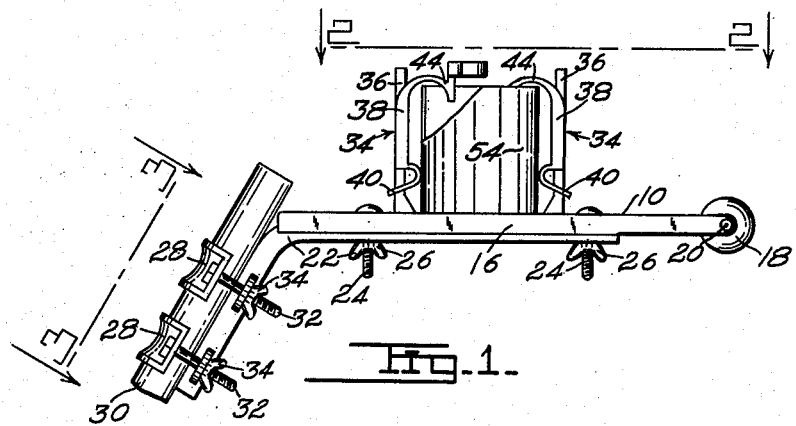
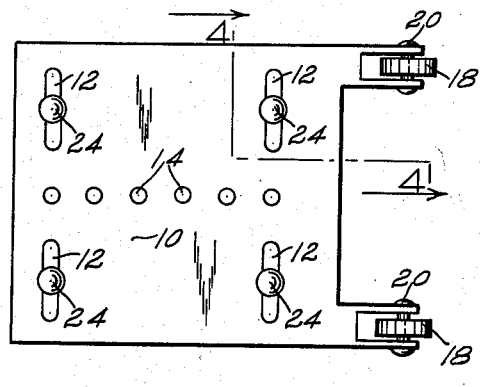
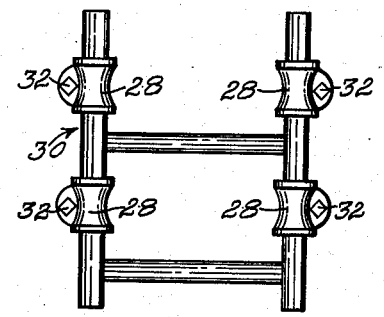
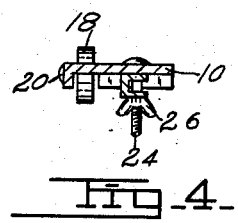
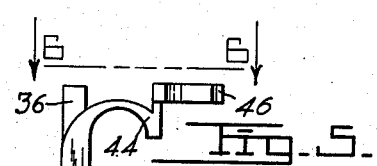
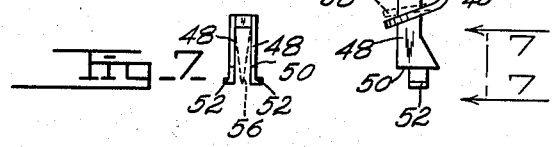
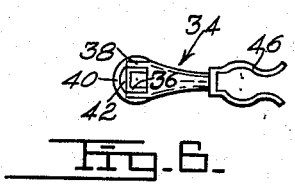
INVENTOR.
ETTORE GIRARDELLO
BY
Adolph G. Martin
ATTORNEY 3,182,749
LADDER PLATFORMS
Ettore Girardello, 15077 Mendota, Detroit, Mich.
Filed Feb. 18, 1963, Ser. No. 259,086
2 Claims. (Cl. 182—120)

This invention relates to ladders generally, and more particularly to an attachable platform support for use on either straight or step ladders.

Professional painters, repair and maintenance men customarily employ scaffolding or extension planks in doing work on both commercial and residential property. Such facilities are selected because they provide indispensible platform space upon which to rest tools and other equipment so as to enable the workmen to operate more efficiently. Homeowners, as amateur workmen, however, seldom have access to such facilities, and usually resort to the use of ladders in painting, repairing or servicing their dwellings.

Step ladders and extension ladders, while adequate for such purposes, are not completely satisfactory, because they fail to make suitable provision for supporting materials and supplies in a conveniently accessible manner. Cognizant of this shortcoming, the applicant has, as the primary object of his invention, the provision of a platform support which is readily attached to conventional ladders.

Another object of the invention is to provide a device of the type previously described which is adapted to facilitate the convenient adjustment of extension ladders.

Still another object of the invention is to provide a device of the type previously described which is extremely stable and relatively inexpensive to produce.

A further object of the invention is the provision of a device of the type previously described which is durably constructed, and very simple to use and operate.

Other features and advantages of the invention will become apparent after consideration of a detailed discussion of the same composed with reference to the drawings constituting a portion of this application, and in which:

FIGURE 1 is an elevation view of the applicant's device attached to a straight ladder, and showing a paint container on the platform with a portion of the container broken away to disclose the retainer hook on the adjustable clip.

FIGURE 2 is a view taken substantially on plane 2—2 in FIGURE 1 with the adjustable clips removed, showing structural details of the platform support.

FIGURE 3 is an elevation view taken substantially on plane 3—3 in FIGURE 1 showing the U-shaped clamps in position on the side rails of the ladder.

FIGURE 4 is a section view taken substantially on plane 4—4 in FIGURE 2, showing the channel bracket attached to the lower side of the table.

FIGURE 5 is an enlarged view of an adjustable clip removed from the table so as to show details of construction.

FIGURE 6 is a plan view taken substantially on plane 6—6 in FIGURE 5, showing configuration of the spring holder on the adjustable clip.

FIGURE 7 is an elevation view taken substantially on plane 7—7 in FIGURE 5, showing the resilient fingers and retainer tabs on the inner telescopic member of the adjustable clip.

FIGURE 8 is an enlarged elevation view of a U-shaped clamp removed from the channel bracket showing the characteristic shape of such member.

For a detailed description of the invention, reference is made to the drawings in which numeral 10 designates a table having therein four transverse slots 12, and a series of centrally disposed circular openings 14. A downwardly turned stiffening flange 16 is provided along each edge of the table 10. A pair of vertically disposed spaced rollers 18 are rotatably mounted at the forward edge of the table 10.

A pair of angular shaped channel brackets 22 are adjustably mounted on the lower side of the table 10 by means of bolts 24 inserted through the transverse slots 12, and secured therein by wing nuts 26. Two U-shaped clamps 28 are mounted on the forward section of each angular channel bracket 22, and held in a gripping engagement with the side rails of a straight ladder 30, partially shown in FIGURES 1 and 3, by means of bolts 32 and wing nuts 33.

A pair of adjustable clips 34 are detachably anchored in two of the centrally disposed circular openings 14 in the table 10. Each clip 34 comprises an inner and an outer telescopic member 36 and 38 respectively. A transverse resilient loop 40 on the lower end of the outer telescopic member 38 has therein a circular opening 42 through which the inner telescopic member 36 extends.

The resilient loop 40 is so disposed that the inner periphery of the circular opening 42 is in a yieldable gripping engagement with the inner telescopic member 36. A downwardly disposed retainer hook 44 is formed on the upper end of the outer telescopic member 38 of each clip 34. A laterally disposed spring holder 46 is provided on one of the clips 34, for supporting tools or paint brushes not here shown. A pair of longitudinally disposed resilient fingers 48 on the lower portion of each inner telescopic member 36 provides a lateral seating shoulder 50 for pivotally supporting the clips 34 in the table 10. Two downwardly and outwardly projecting tabs 52 on the resilient fingers 48 removably retain the clips 34 in their assigned positions on the table 10.

The preceding discussion completes a description of the structural details of the applicant's invention as herein disclosed; however, to insure a more thorough appreciation and understanding of the subject matter presented, a brief discussion will be directed to the manner in which the invention is used to perform its intended function.

The applicant's platform support functions with equal effectiveness on straight ladders, A ladders, step ladders or extension ladders, whether they are constructed of wood or metal, regardless of their size. However, to simplify a discussion directed to the use and operation of the applicant's device, the explanation will be related only to a straight ladder as illustrated in the drawings.

In practice, the wing nuts 26 on the bolts 24 are loosened so that the channel brackets 22 may be positioned laterally to accommodate the ladder 30. The U-shaped clamps 28 on the forward end of each channel bracket 22 are then placed over the side rails of the ladder 30, as shown in FIGURES 1 and 3 of the drawings. The wing nuts 34 are next tightened so as to draw the U-shaped clamps 28 into a holding engagement with the side rails of the ladder 30.

The ladder 30 is then placed in an upright position against any suitable support. If a painting or washing operation is to be undertaken, a paint or water container 54, is placed on the table 10 of the platform support. To hold the container 54 in position on the tabel 10, an adjustable clip 34 is inserted into a circular opening 14 in the table 10 on each side of the container 54.

This is done by squeezing the resilient fingers 48 on the inner telescopic member 36 to the broken line position 56 shown in FIGURE 7 so that the tabs 52 can pass through the circular opening 14 in the table 10. The resilient fingers 48 are then released, and return to the full line position in FIGURE 7, whereupon the tabs 52 engage the under side of the table 10. The lateral shoulders 50 are thus held in contact with the upper surface of the table 10 and provide a seat for supporting the adjustable clip 34.

The clip 34 is then adjusted vertically so that the downwardly disposed hooks 44 on the outer telescopic members 36 holdably engage the upper edge of the container 54 as shown in FIGURE 1. This is done by flexing the resilient loop 40 to the broken line position 58 shown in FIGURE 5, so as to release the inner telescopic member 36. When the clip 36 has been properly adjusted for height, the resilient loop 40 is released, and returns to the full line position shown in FIGURE 5. The inner and outer telescopic members 36 and 38 respectively of the clip 34 are then locked against any relative movement therebetween.

Based upon the foregoing discussion, the applicant is of the opinion that his invention has fulfilled a long-felt need in the field of ladders, and that he has accordingly made a valuable contribution to the related art. However, while the invention was described with reference to the structural details of a single embodiment, it will be appreciated by those familiar with the art, that the principles involved are susceptible of numerous other practical adaptations.

Therefore, I claim as new, and desire to secure by Letters Patent:

1. A platform support for ladders having two side rails, said platform support comprising a table having therein a series of spaced openings, a pair of laterally adjustable brackets mounted on the lower side of the table, said brackets each having a downwardly disposed end portion projecting beyond one side of the table, a clamp on the downwardly disposed end portion of each bracket for attachment to the side rails of the ladder, spaced rollers mounted along one side of the table, a telescopic clip detachably mounted in the spaced openings of the table.

2. An adjustable clip for removable attachment to a support having therein spaced openings, such clip comprising two telescopic members, a pair of resilient fingers on one of the telescopic members, an outwardly disposed tab on each of the resilient fingers proportioned to pass through one of the spaced openings in the support when the resilient fingers are flexed together, an angularly disposed resilient loop on one of the telescopic members having an opening therethrough enclosing the other telescopic member, an engaging surface on the inner periphery of the opening in the resilient loop yieldably gripping the telescopic member passing therethrough and gripping means on one of the telescopic members for yieldably holding objects.

References Cited by the Examiner

UNITED STATES PATENTS

| | | | |
|---|---|---|---|
| 1,283,160 | 10/18 | Gross | 248—210 |
| 2,308,180 | 1/43 | Larsen | 182—129 |
| 2,498,511 | 2/50 | Smith | 248—313 |
| 2,597,902 | 5/52 | Roketa | 182—214 |
| 2,806,642 | 9/57 | Miele | 192—214 |

FOREIGN PATENTS 125,682    5/28    Switzerland.

HARRISON R. MOSELEY, *Primary Examiner.*

REINALDO P. MACHADO, *Examiner.*